(12) United States Patent
Cloft et al.

(10) Patent No.: US 8,312,728 B2
(45) Date of Patent: Nov. 20, 2012

(54) GENERATOR WITH SEPARATE OIL SYSTEM FOR IMPROVED NACELLE PERFORMANCE

(75) Inventors: Thomas G. Cloft, Glastonbury, CT (US); Robert L. Gukeisen, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1319 days.

(21) Appl. No.: 11/823,652

(22) Filed: Jun. 28, 2007

(65) Prior Publication Data

US 2009/0000308 A1    Jan. 1, 2009

(51) Int. Cl.
*F02C 6/00* (2006.01)

(52) U.S. Cl. .......................................................... 60/802

(58) Field of Classification Search .................. 60/39.08, 60/786, 788, 802; 244/58; 184/6.11
See application file for complete search history.

(56) References Cited

U.S. PATENT DOCUMENTS

| | | | |
|---|---|---|---|
| 3,806,067 A | 4/1974 | Kutney | |
| 4,147,029 A | 4/1979 | Sargisson | |
| 4,437,627 A * | 3/1984 | Moorehead | 244/54 |
| 4,474,001 A | 10/1984 | Griffin et al. | |
| 5,253,470 A * | 10/1993 | Newton | 60/39.08 |
| 5,636,708 A * | 6/1997 | Wedeven et al. | 184/6.22 |
| 6,851,267 B2 | 2/2005 | Bruno et al. | |
| 6,945,031 B2 | 9/2005 | Lair | |
| 7,090,165 B2 | 8/2006 | Jones et al. | |
| 7,104,072 B2 | 9/2006 | Thompson | |
| 7,105,937 B2 | 9/2006 | Hoppe et al. | |
| 7,116,003 B2 | 10/2006 | Hoppe | |
| 7,117,683 B2 | 10/2006 | Thompson | |
| 2005/0150204 A1 | 7/2005 | Stretton et al. | |

* cited by examiner

*Primary Examiner* — Phutthiwat Wongwian
(74) *Attorney, Agent, or Firm* — Kinney & Lange, P.A.

(57) ABSTRACT

An electrical generator assembly for use in a gas turbine engine, which assembly includes an electrical motor configured to connect to an accessory gearbox arranged radially outward of a main axis of the gas turbine engine and inside a nacelle, and fluid connections between the electrical motor and a generator oil system. The generator oil system is offset from the electrical motor such that the generator oil system is not located radially outward of the electrical motor and inside the nacelle.

27 Claims, 5 Drawing Sheets

GENERATOR WITH SEPARATE OIL SYSTEM FOR IMPROVED NACELLE PERFORMANCE

BACKGROUND

The present invention relates to electrical generators used in gas turbine engines. More particularly, the present invention relates to a generator with an oil system separated from the generator motor.

Gas turbine engines, such as turbofans, commonly include accessory systems, which may be distinguished from the principle engine components, for example, the fan, compressors, combustor, and turbines. One such accessory system is the generator, sometimes referred to as the starter generator, integrated drive generator, variable frequency drive generator, or variable frequency generator. The generator is an electrical system used to power various electrical systems in the engine, as well as the onboard electrical systems of the plane to which the engine is attached. The generator is commonly attached to and driven by an accessory gearbox, which in turn is driven by one of the engine main shafts, for example, the compressor shaft. The generator and accessory gearbox are commonly mounted radially outward from the main axis of the engine, aft of the fan and low pressure compressor section, and inside a nacelle around which working medium gas is driven by the fan section to produce thrust.

Generators create several challenges in gas turbine engine design. In particular, the size and arrangement of prior generators in gas turbine engines has degraded engine efficiency by necessitating a radially outward bulge in the nacelle surrounding the generator. The nacelle shape is important to engine efficiency, as the nacelle defines the aerodynamic surface across which working medium gas is driven from the fan section to produce thrust. The bulge in the nacelle shape surrounding the generator degrades efficiency by acting to remove energy from the working medium gas as it travels over the bulged surface. In high bypass turbofan engines, the nacelle shape is particularly important to engine efficiency, because a large percentage, for example 75%, of the thrust used to propel the engine is produced by the fan section. Additionally, the generator commonly remains the same size regardless of the engine size, which makes the relative size of the generator with respect to the engine increase as the engine gets smaller. As the relative size of the generator increases, so does the relative size of the bulge in the nacelle surrounding the generator. Therefore, the performance penalty resulting from the sub-optimum nacelle shape surrounding the generator increases as the engines size decreases.

SUMMARY

The present invention includes an electrical generator assembly for use in a gas turbine engine, which assembly includes an electrical motor configured to connect to an accessory gearbox arranged radially outward of a main axis of the gas turbine engine and inside a nacelle, and fluid connections between the electrical motor and a generator oil system. The generator oil system is offset from the electrical motor such that the generator oil system is not located radially outward of the electrical motor and inside the nacelle.

Embodiments of the present invention may also include an accessory system used in a gas turbine engine, which system includes a gearbox driven by a shaft of the gas turbine engine, an electrical generator connected to the gearbox, a generator oil system connected to the gearbox, and fluid connections between the electrical generator and the generator oil system. The gearbox, the electrical generator, and the generator oil system are configured to be arranged radially outward of a main axis of the gas turbine engine and inside a nacelle. The generator oil system is offset from the electrical generator such that the generator oil system is not located radially outward of the electrical generator.

DETAILED DESCRIPTION

Figure 1:
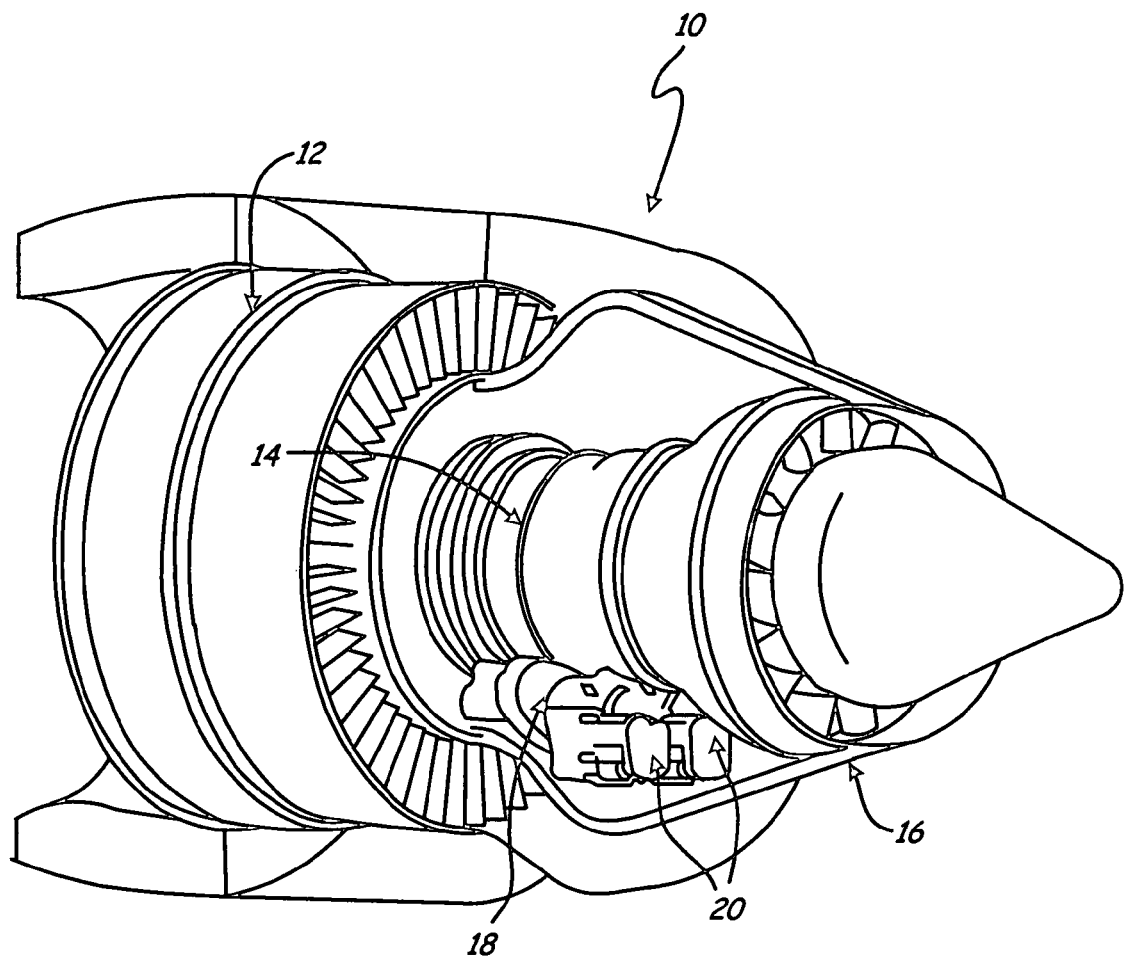
FIG. 1 is a perspective view of a gas turbine engine including prior art generators.

FIG. 1 is a perspective view from the back or aft side of gas turbine engine 10 including fan section 12, engine core 14, nacelle 16, accessory gearbox 18, and two prior art generators 20. In FIG. 1, fan section 12 is located in the front of engine 10 and is configured to rotate about a main axis of engine 10. Fan section 12 draws working medium gas, for example air, into the front of engine 10. Fan section 12 may also include one or more low pressure compressor stages nested radially inward of one or more fan rotors in fan section 12. The gas drawn into engine 10 by fan section 12 is commonly separated into two flow streams. One gas flow stream exits fan section 12 and proceeds aftward into engine core 14. Engine core 14 commonly includes high pressure compressor stages, a combustor, and a turbine section, which may include low and high pressure turbine stages. The gas is compressed in the compressor section, mixed with fuel and ignited in the combustor and expanded in the turbine section. A portion of the energy extracted from the gas by expansion in the turbine section is used to drive fan section 12 and the compressor section in engine core 14. The remaining energy of the gas is used to produce thrust by driving the gas from the turbine section in engine core 14 out the rear of engine 10. The gas stream not diverted into engine core 14 exits fan section 12, proceeds aftward over the outside of nacelle 16, and exits engine 10 to produce thrust.

Figure 2:
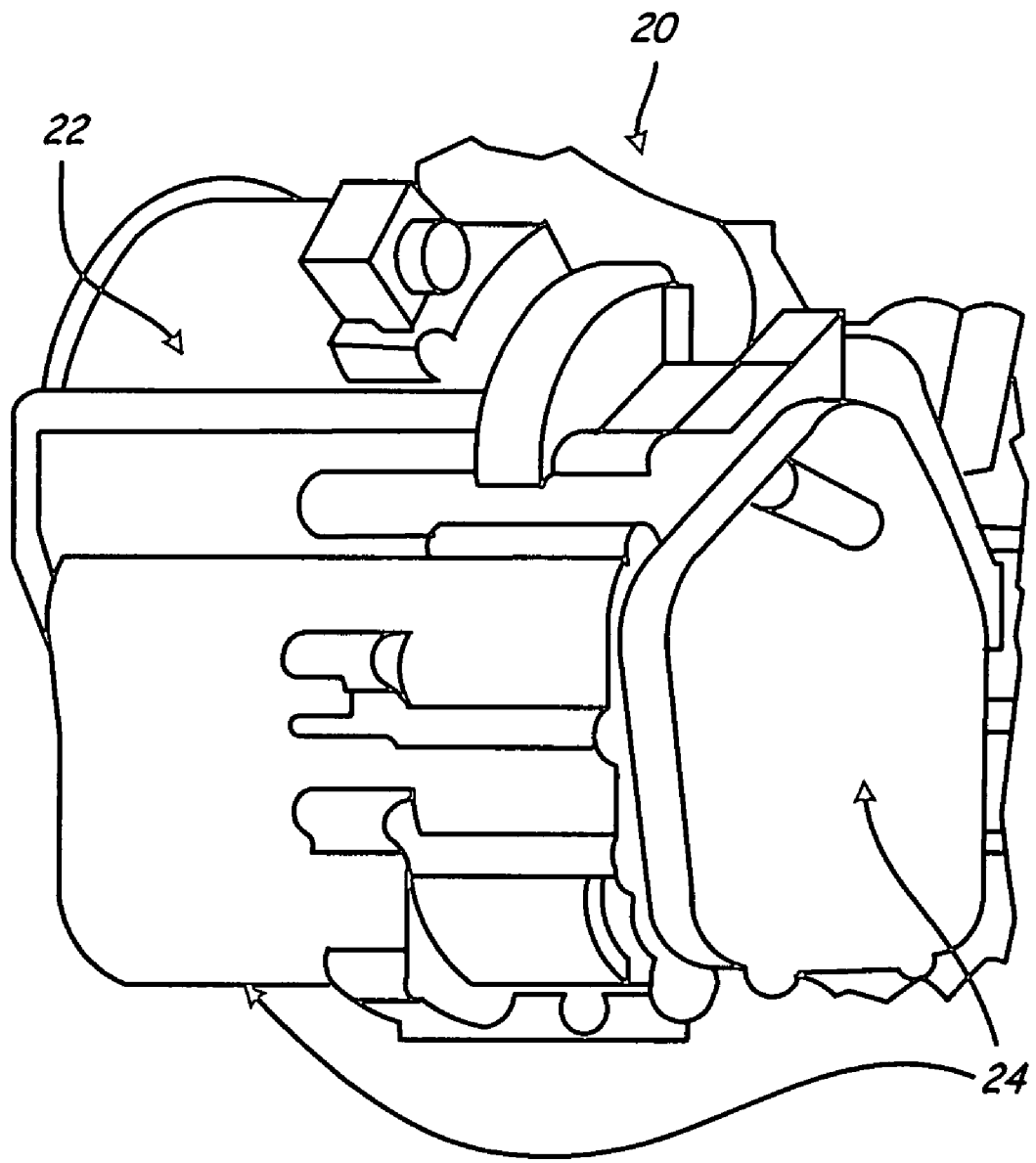
FIG. 2 is a detail view of one of the generators shown in FIG. 1.

Engine 10 shown in FIG. 1 includes accessory gearbox 18 and two prior art generators 20. Generators 20 are mounted on an aft side of gearbox 18. Gearbox 18 and generators 20 are connected to engine 10 and located radially outward of engine compartment 14 and inside nacelle 16. Gearbox 18 may be driven by a power take-off shaft connected to one of the main shafts of engine 10, for example, a compressor shaft. Generators 20 are in turn driven by gearbox 18. Each of generators 20 includes motor 22 and oil system 24 shown in FIG. 2, which is a detail view of one generator 20 of FIG. 1. In FIG. 2, oil system 24 may include an oil pump fluidly connected to motor 22 and a reservoir fluidly connected to the pump and motor 22.

Figure 3:
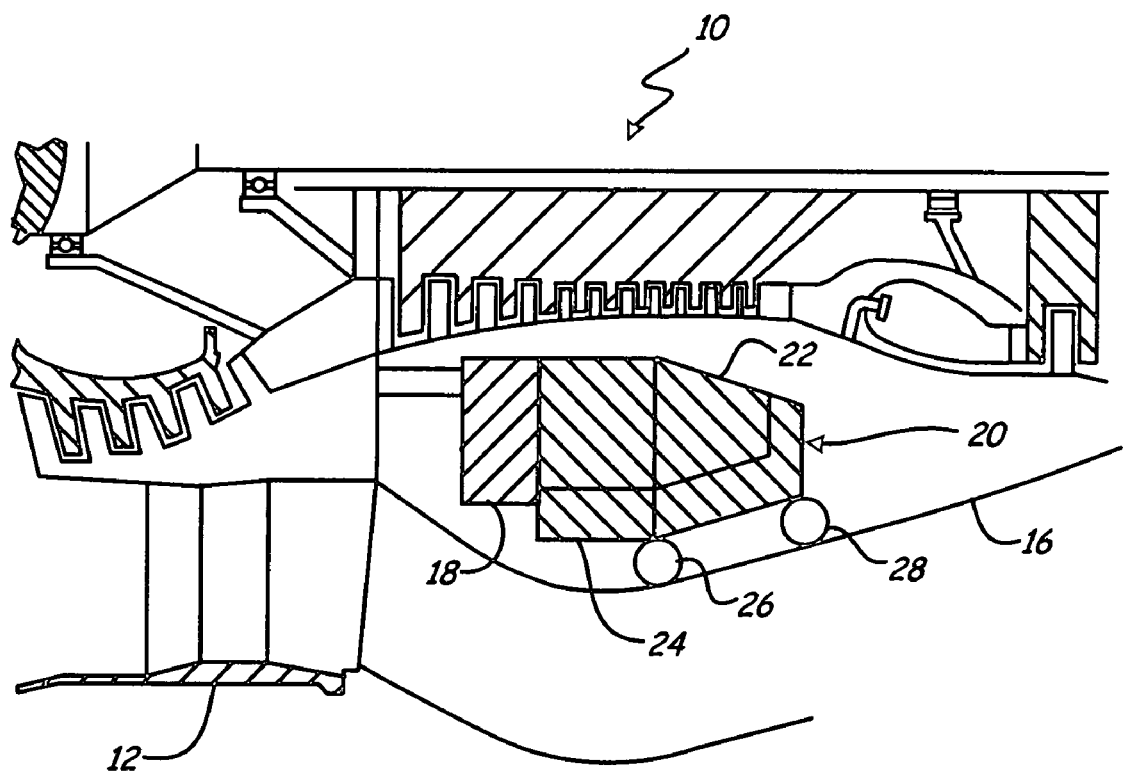
FIG. 3 is a schematic section view of the gas turbine engine of FIG. 1.

FIG. 3 is a schematic section view of engine 10 shown in FIG. 1 including fan section 12, nacelle 16, accessory gearbox 18, generator 20, and gaps 26, 28 (shown schematically as circles). Generator 20 includes generator motor 22 and oil system 24. In FIG. 3, the size and arrangement of generator 20 in engine 10 defines the shape of nacelle 16 adjacent generator 20. Specifically, gaps 26, 28 define a distance between two maximum radial dimensions of generator 20 and two points on nacelle 16 adjacent generator 20. Gaps 26, 28 represent clearance distances between generator 20 and nacelle 16, which act as a limiting design constraint on the aerodynamic shape of nacelle 16. In engine 10 shown in FIGS. 1 and 2, the size of generator 20 necessitates a radially outward bulge in nacelle 16 at gap distances 26, 28. The bulge in the shape of nacelle 16 surrounding generator 20 degrades the efficiency of engine 10 by acting to remove energy from the working medium gas as it travels over the bulged surface.

Figure 4:
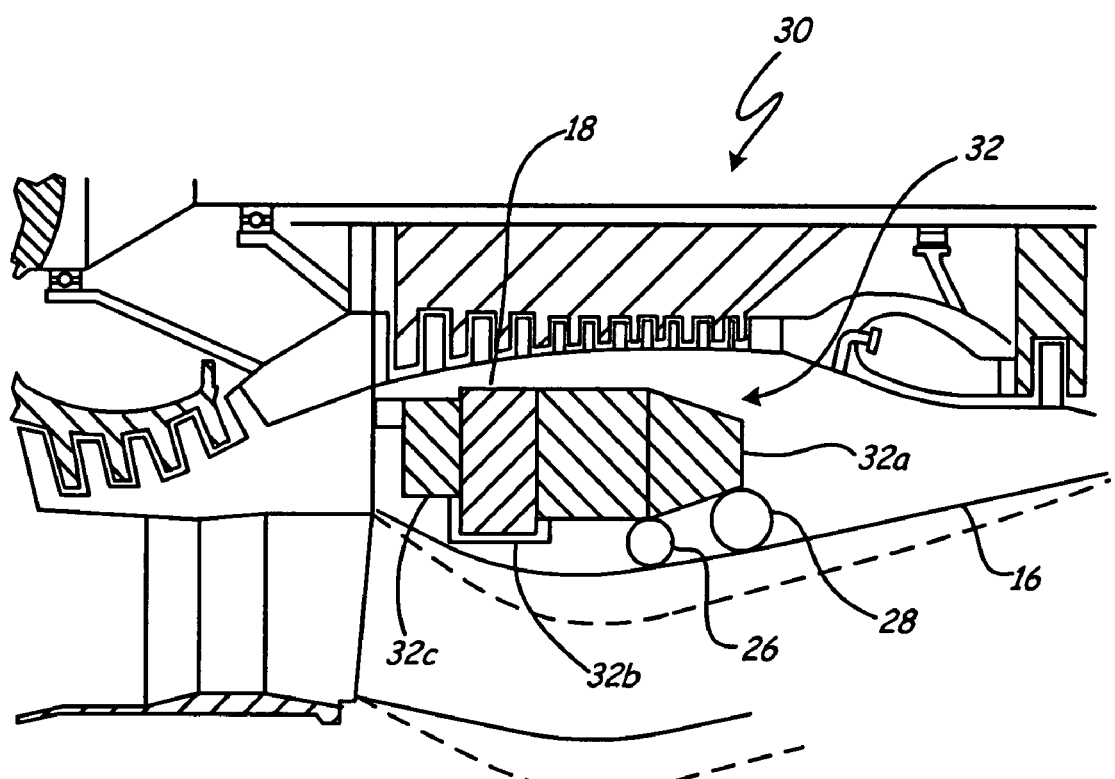
FIG. 4 is a schematic section view of an embodiment of a gas turbine engine according to the present invention including a generator with a generator oil system separated from a generator motor.

FIG. 4 is a schematic section view of an embodiment of gas turbine engine 30 according to one aspect of the present disclosure including nacelle 16, gearbox 18, and generator 32. Generator 32 may include motor 32a, one or more fluid connections 32b, and oil system 32c. In FIG. 4, generator motor 32a is mounted on an aft side of gearbox 18. Gearbox 18 may be driven directly or indirectly by a main shaft of engine 30, for example the compressor shaft, and in turn gearbox 18 drives generator motor 32a. Generator oil system 32c, which may include a pump and a reservoir, is offset from motor 32a, for example, offset axially from motor 32a and mounted on a forward side of gearbox 18 as shown in FIG. 4. In another embodiment of the present invention, oil system 32c may be radially offset from motor 32a. Oil system 32c may be driven by gearbox 18 and connected to motor 32a by fluid connections 32b. For example, the pump of oil system 32c is driven by gearbox 18 and fluidly connected to motor 32a by fluid connections 32b. The pump may be configured to supply motor 32a with oil drawn from the reservoir, which is fluidly connected to the pump and motor 32a by fluid connections 32b.

Figure 5:
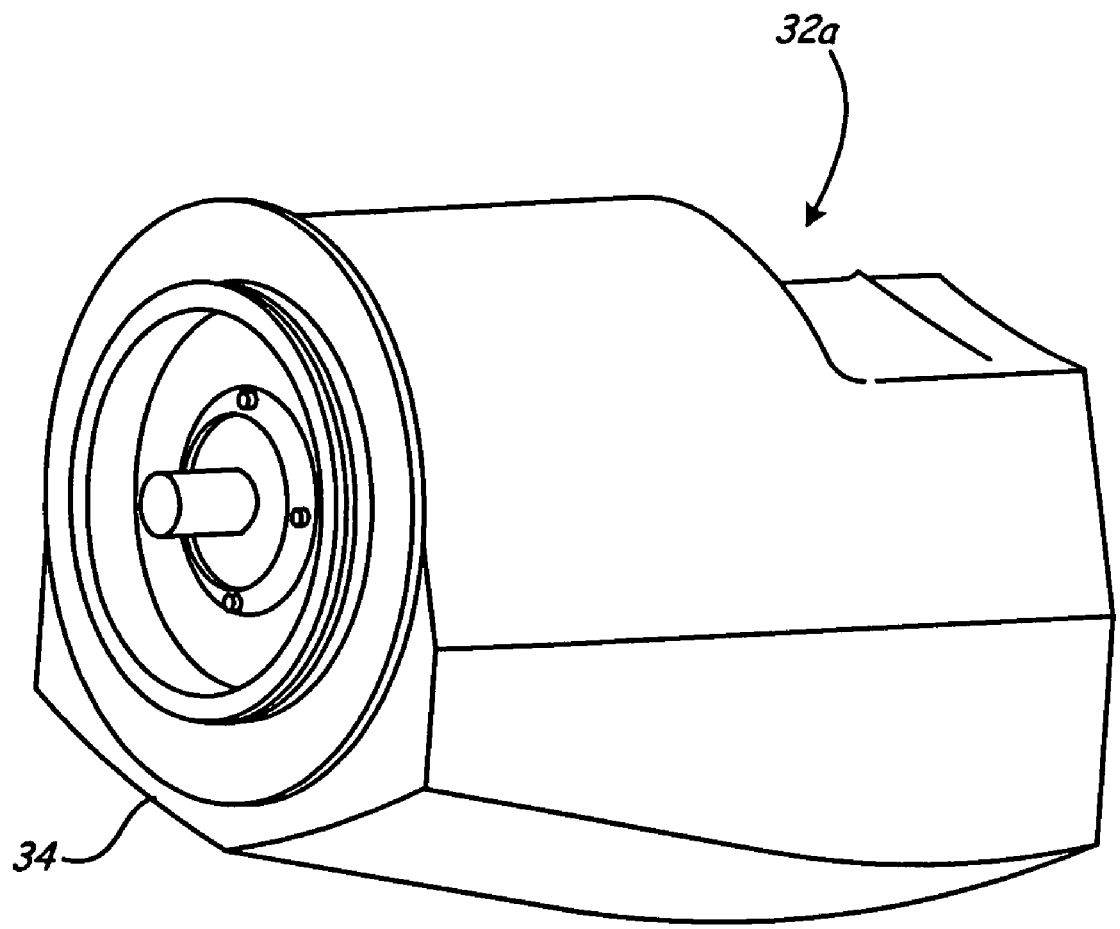
FIG. 5 is a perspective view of the generator motor shown in FIG. 4.

In FIG. 4, the maximum radial dimension of generator 32 has been significantly reduced by offsetting oil system 32c from motor 32a. Reducing the maximum radial dimension of generator 32 significantly reduces the limiting effect of clearance gaps 26, 28 on the aerodynamic shape of nacelle 16. As shown in FIG. 4, the radial bulge in the shape of nacelle 16 surrounding generator 32 has been substantially reduced, while maintaining the required clearance gaps 26, 28 between generator 32 and nacelle 16. The size of generator 32 may be further reduced, and in turn the aerodynamic shape of nacelle 16 further improved, by contouring the bottom surface of housing 34 surrounding generator motor 32a as shown in FIG. 5, which is a perspective view of generator motor 32a of FIG. 4.

Generators according to the present disclosure may include oil systems arranged in various locations offset from the generator motors to which they supply oil. For example, generator 32 may include oil system 32c located inside nacelle 16 and radially offset from generator motor 32a and accessory gearbox 18 about the main axis of engine 30. In this alternative embodiment, oil system 32c may be driven by a small electric motor and fluidly connected to generator motor 32a mounted to gearbox 18. Another embodiment may include arranging generator oil system 32c in the fan section 12. In still another embodiment of a generator according to the present invention, generator oil system 32c may be mounted outside of engine 30, for example, oil system 32c may be mounted on the plane to which engine 30 is attached.

Generators according to the present invention have several advantages over prior generators used in gas turbine engines. The size of generators according to the present invention is significantly reduced by offsetting the oil system from the generator motor. Reducing the size of the generator reduces the maximum radial dimension of the generator from the main axis of the engine to which the generator is attached. Reducing the maximum radial dimension of generators according to the present invention in turn reduces the limiting effect of the generator size on the aerodynamic shape of the nacelle surrounding the generator. Specifically, generators according to the present invention improve the aerodynamic shape of the nacelle by significantly reducing the size of the radially outward bulge in the nacelle surrounding the generator. Improving the aerodynamic shape of the nacelle significantly improves overall engine efficiency, which in turn reduces operation costs by improving fuel economy.

Although the present invention has been described with reference to preferred embodiments, workers skilled in the art will recognize that changes may be made in form and detail without departing from the spirit and scope of the invention.

The invention claimed is:

1. An accessory system used in a gas turbine engine, the system comprising:
   a gearbox driven by a shaft of the gas turbine engine;
   an electrical generator motor connected to an aft side of the gearbox;
   a generator oil system having at least one pump, the generator oil system connected to a forward side of the gearbox; and
   one or more fluid connections connecting the electrical generator motor to the generator oil system;
   wherein the gearbox, the electrical generator motor, and the generator oil system are configured to be arranged radially outward of a main axis of the gas turbine engine and inside a nacelle; and
   wherein the generator oil system is offset from the electrical generator motor such that the generator oil system is not located radially outward of the electrical generator motor.

2. The system of claim 1, wherein the generator oil system is axially offset from the electrical generator motor.

3. The system of claim 1, wherein the generator oil system is circumferentially offset from the electrical generator motor.

4. The system of claim 1, wherein in the generator oil system is axially and circumferentially offset from the electrical generator motor.

5. The system of claim 1, wherein the electrical generator motor and the generator oil system are arranged to reduce one or more radial dimensions of the accessory system from the main axis of the gas turbine engine.

6. The system of claim 1, wherein the electrical generator motor and the generator oil system are arranged to provide clearance for reducing one or more radial dimensions of the nacelle from the main axis of the gas turbine engine.

7. The system of claim 1, wherein the electrical generator motor further comprises:
   a housing contoured to reduce one or more radial dimensions of the electrical generator motor from the main axis of the gas turbine engine.

8. The system of claim 7, wherein the contoured housing is configured to provide clearance for reducing one or more radial dimensions of the nacelle from the main axis of the gas turbine engine.

9. The system of claim 1, wherein the generator oil system further comprises:
   the at least one pump connected to the accessory gearbox; and
   at least one reservoir fluidly connected to that at least one pump and to the electrical generator motor.

10. A gas turbine engine comprising:
    a fan section, a compressor section, a combustor, and a turbine section;

a nacelle proceeding aft from the fan section and surrounding the compressor section, the combustor, and the turbine section;

an electrical generator motor connected to an aft side of an accessory gearbox located aft of the fan section, radially outward of the compressor section, the combustor, and the turbine section, and inside the nacelle;

a generator oil system having at least one pump, the generator oil system connected to a forward side of the gearbox inside the nacelle; and one or more fluid connections connecting the electrical generator motor to the generator oil system, wherein the generator oil system is offset from the electrical generator motor such that the generator oil system is not located radially outward of the electrical generator motor.

11. The engine of claim 10, wherein the generator oil system is axially offset from the electrical generator motor.

12. The engine of claim 10, wherein the generator oil system is circumferentially offset from the electrical generator motor.

13. The engine of claim 10, wherein the generator oil system is axially and circumferentially offset from the electrical generator motor.

14. The engine of claim 10, wherein the electrical generator motor and the generator oil system are arranged to provide clearance for reducing one or more radial dimensions of the nacelle from the main axis of the gas turbine engine.

15. The engine of claim 10, wherein the electrical generator motor further comprises:

a housing surrounding the electrical generator motor contoured to reduce one or more radial dimensions of the electrical generator motor from the main axis of the gas turbine engine.

16. The engine of claim 15, wherein the contoured housing is configured to provide clearance for reducing one or more radial dimensions of the nacelle from the main axis of the gas turbine engine.

17. The engine of claim 10, wherein the generator oil system further comprises:

the at least one pump connected to the accessory gearbox; and at least one reservoir fluidly connected to the at least one pump and to the electrical generator motor.

18. The engine of claim 10, wherein the generator oil system is driven by the accessory gearbox to pump oil to the electrical generator motor.

19. An electrical generator assembly for use in a gas turbine engine, the generator assembly comprising:

an electrical motor configured to connect to an aft side of an accessory gearbox arranged radially outward of a main axis of the gas turbine engine and inside a nacelle; and one or more fluid connections connecting the electrical motor to a generator oil system having at least one pump;

wherein the generator oil system is connected to a forward side of the accessory gearbox and is offset from the electrical motor such that the generator oil system is not located radially outward of the electrical motor and inside the nacelle.

20. The assembly of claim 19, wherein the generator oil system is axially offset from the electrical motor.

21. The assembly of claim 19, wherein the generator oil system is circumferentially offset from the electrical motor.

22. The assembly of claim 19, wherein the generator oil system is axially and circumferentially offset from the electrical motor.

23. The assembly of claim 19, wherein the generator oil system is offset from the electrical motor to reduce one or more radial dimensions of the electrical generator assembly from the main axis of the gas turbine engine.

24. The assembly of claim 19, wherein the generator oil system is offset from the electrical motor to provide clearance for reducing one or more radial dimensions of the nacelle from the main axis of the gas turbine engine.

25. The assembly of claim 19, wherein the electrical motor further comprises:

a housing contoured to reduce one or more radial dimensions of the electrical generator assembly from the main axis of the gas turbine engine.

26. The assembly of claim 25, wherein the housing is configured to provide clearance for reducing one or more radial dimensions of the nacelle from the main axis of the gas turbine engine.

27. The assembly of claim 19, wherein the generator oil system further comprises:

the at least one pump configured to connect to the accessory gearbox; and at least one reservoir fluidly connected to the pump and to the electrical motor.

* * * * *